US012411545B2

(12) United States Patent
Suzuki

(10) Patent No.: US 12,411,545 B2
(45) Date of Patent: Sep. 9, 2025

(54) RECORDING DEVICE, IMAGE-CAPTURING APPARATUS, CONTROL METHOD, AND RECORDING SYSTEM

(71) Applicant: CANON KABUSHIKI KAISHA, Tokyo (JP)

(72) Inventor: Yasuyuki Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 18/493,408

(22) Filed: Oct. 24, 2023

(65) Prior Publication Data
US 2024/0085979 A1 Mar. 14, 2024

Related U.S. Application Data

(63) Continuation of application No. PCT/JP2022/018625, filed on Apr. 22, 2022.

(30) Foreign Application Priority Data

Apr. 28, 2021 (JP) ................. 2021-076748

(51) Int. Cl.
G06F 3/01 (2006.01)
H04N 23/695 (2023.01)

(52) U.S. Cl.
CPC ........... *G06F 3/013* (2013.01); *H04N 23/695* (2023.01)

(58) Field of Classification Search
CPC .... G06F 3/013; H04N 23/695; H04N 23/611; H04N 5/92; H04N 23/60; G03B 17/00
See application file for complete search history.

(56) References Cited

U.S. PATENT DOCUMENTS

| 5,689,619 A * | 11/1997 | Smyth .................. B60K 35/235 706/45 |
| 6,426,740 B1 * | 7/2002 | Goto ......................... A61F 4/00 345/157 |
| 6,677,969 B1 * | 1/2004 | Hongo ..................... G06F 3/017 715/863 |
| 7,561,143 B1 * | 7/2009 | Milekic ................... G06F 3/013 345/32 |
| 9,652,034 B2 * | 5/2017 | He ........................... G06F 3/013 |
| 11,868,672 B1 * | 1/2024 | Dehkordi ................ G06F 9/451 |
| 2011/0109880 A1 * | 5/2011 | Nummela .......... G02B 27/0081 351/210 |
| 2013/0063340 A1 * | 3/2013 | Mondragon ............. G09G 5/00 345/156 |
| 2015/0332091 A1 * | 11/2015 | Kim ..................... H04N 5/2621 382/103 |
| 2016/0246384 A1 * | 8/2016 | Mullins ................... G06F 3/017 |
| 2019/0354171 A1 * | 11/2019 | Dai ......................... G06F 3/013 |
| 2022/0253146 A1 * | 8/2022 | Erivantcev ............. G06F 3/016 |
| 2022/0261073 A1 * | 8/2022 | Francis ................... G06F 3/017 |

FOREIGN PATENT DOCUMENTS

| JP | 2001-36901 A | 2/2001 |
| JP | 2004-181233 A | 7/2004 |
| JP | 2018207415 A | 12/2018 |
| WO | 2019/171522 A1 | 9/2019 |

* cited by examiner

*Primary Examiner* — Chiawei Chen
(74) *Attorney, Agent, or Firm* — Canon U.S.A., Inc., IP Division

(57) ABSTRACT

In the case where a confirmation operation is performed by a user, a CPU 3 performs control to store information related to the confirmation operation in association with a still image or a moving image displayed on a display element 10.

10 Claims, 12 Drawing Sheets

FIG. 1
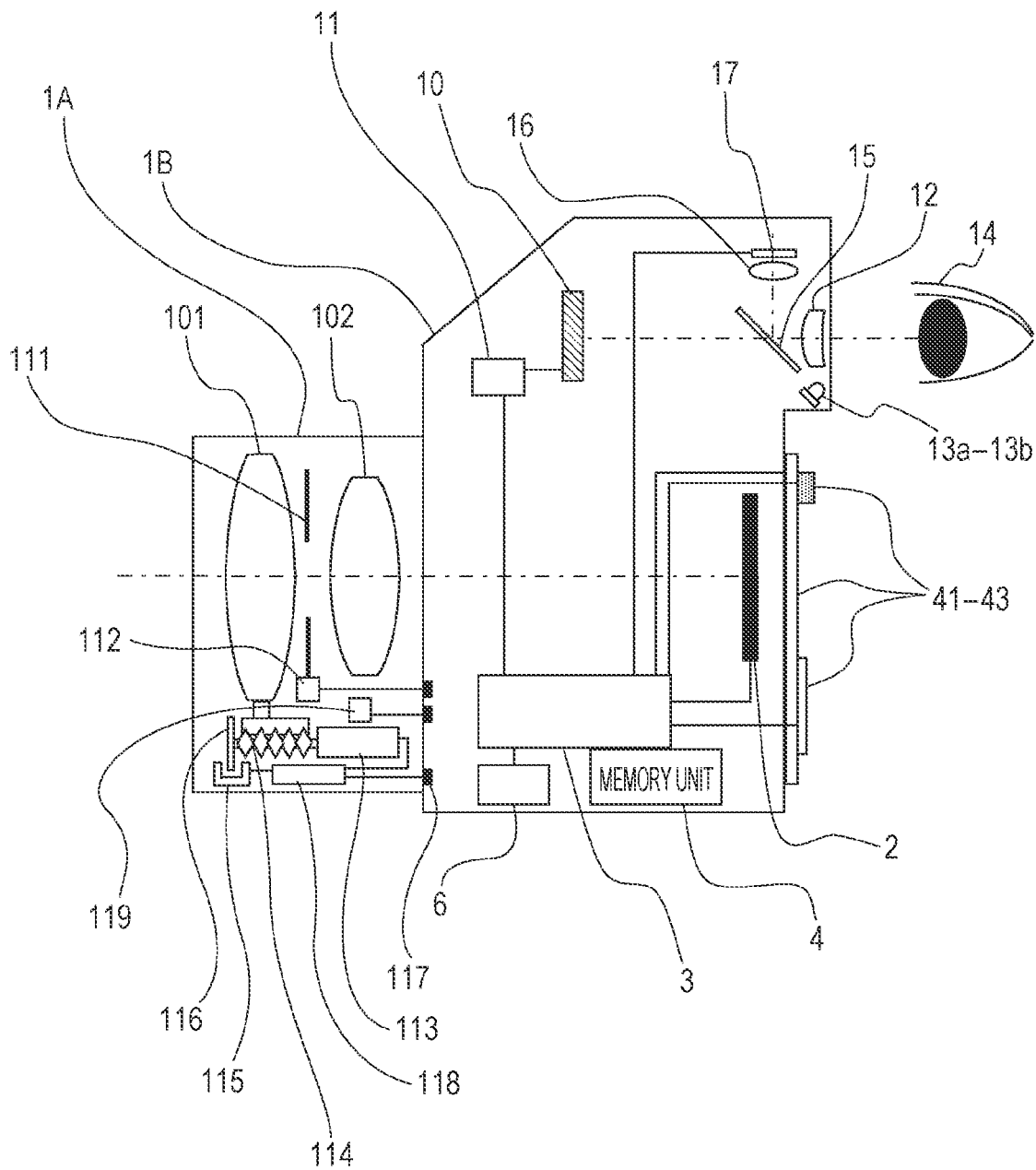
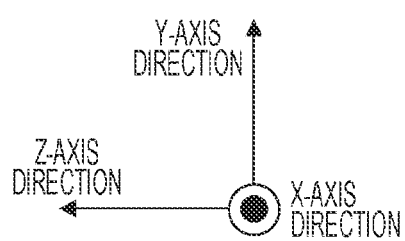

RECORDING DEVICE, IMAGE-CAPTURING APPARATUS, CONTROL METHOD, AND RECORDING SYSTEM

CROSS-REFERENCE TO RELATED APPLICATIONS

This application is a Continuation of International Patent Application No. PCT/JP2022/018625, filed Apr. 22, 2022, which claims the benefit of Japanese Patent Application No. 2021-076748, filed Apr. 28, 2021, both of which are hereby incorporated by reference herein in their entirety.

TECHNICAL FIELD

The present invention relates to a device capable of detecting a line of sight.

BACKGROUND ART

In recent years, cameras have become increasingly automated and intelligent, and a technique of obtaining and using position information of a line of sight of an image-capturing person (user) has been proposed.

Japanese Patent Laid-Open No. 2018-207415 discloses a technique of adding position information of a line of sight of an image-capturing person during image-capturing to images and displaying a locus of an image-capturing position to be superimposed on the captured images after the image-capturing.

CITATION LIST

Patent Literature

PTL 1: Japanese Patent Laid-Open No. 2018-207415

Further improvement is desired in terms of information added to an image.

SUMMARY OF INVENTION

Accordingly, it is an object of the present invention to provide a recording device, an image-capturing apparatus, a control method, and a recording system that enable an intention of an image-capturing person to be reflected.

Accordingly, the present invention is configured to include an eyeball imaging element configured to obtain an eyeball image of a user; calculation means configured to calculate, from the eyeball image obtained from the eyeball imaging element, a point of gaze corresponding to a line of sight of the user onto display means on which a still image or a moving image is displayed; an operation member configured to receive an operation performed by the user to perform a confirmation operation for confirming a point of gaze; and storage means configured to store information related to the confirmation operation in association with the still image or the moving image displayed on the display means in a case where the confirmation operation is performed by the user.

Further features of the present invention will become apparent from the following description of exemplary embodiments with reference to the attached drawings.

BRIEF DESCRIPTION OF DRAWINGS

FIG. 1 is a schematic configuration diagram of an image-capturing apparatus to which a first embodiment of the present invention is applied.

DESCRIPTION OF EMBODIMENTS

Preferred embodiments of the present invention will be described in detail below with reference to the accompanying drawings.

First Exemplary Embodiment

<Description of Configuration>

Figure 2A:
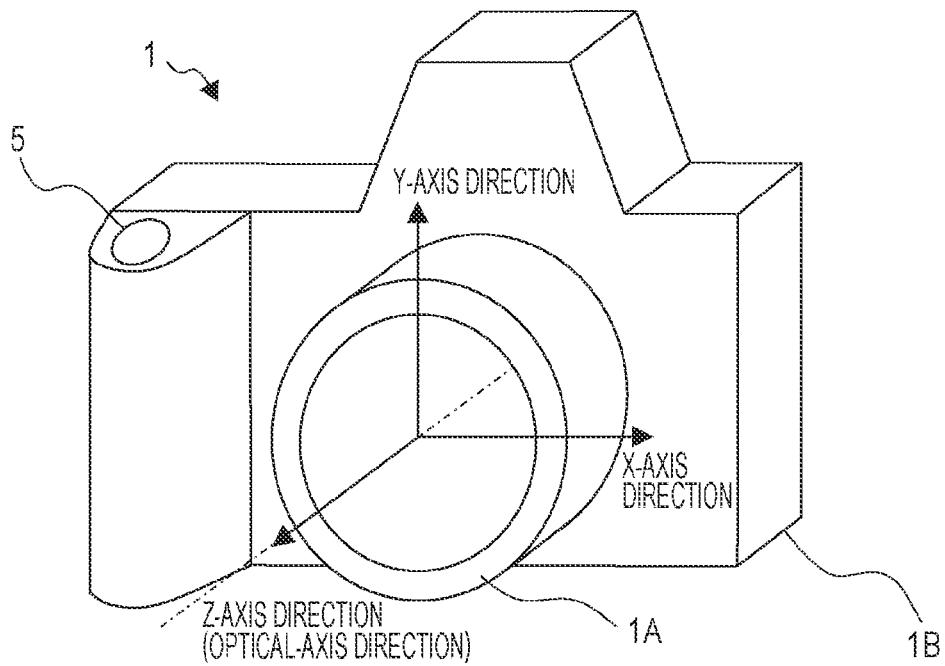
FIG. 2A is a schematic external view of the image-capturing apparatus in the first embodiment of the present invention.
Figure 2B:
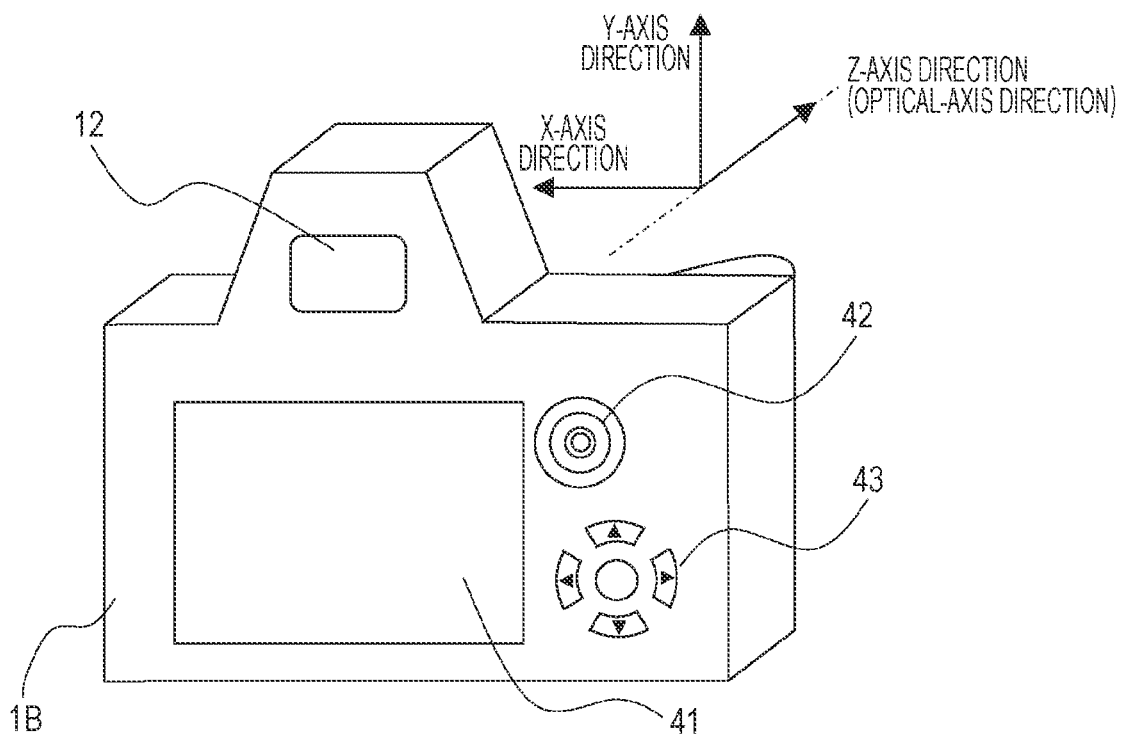
FIG. 2B is a schematic external view of the image-capturing apparatus in the first embodiment of the present invention.
Figure 3:
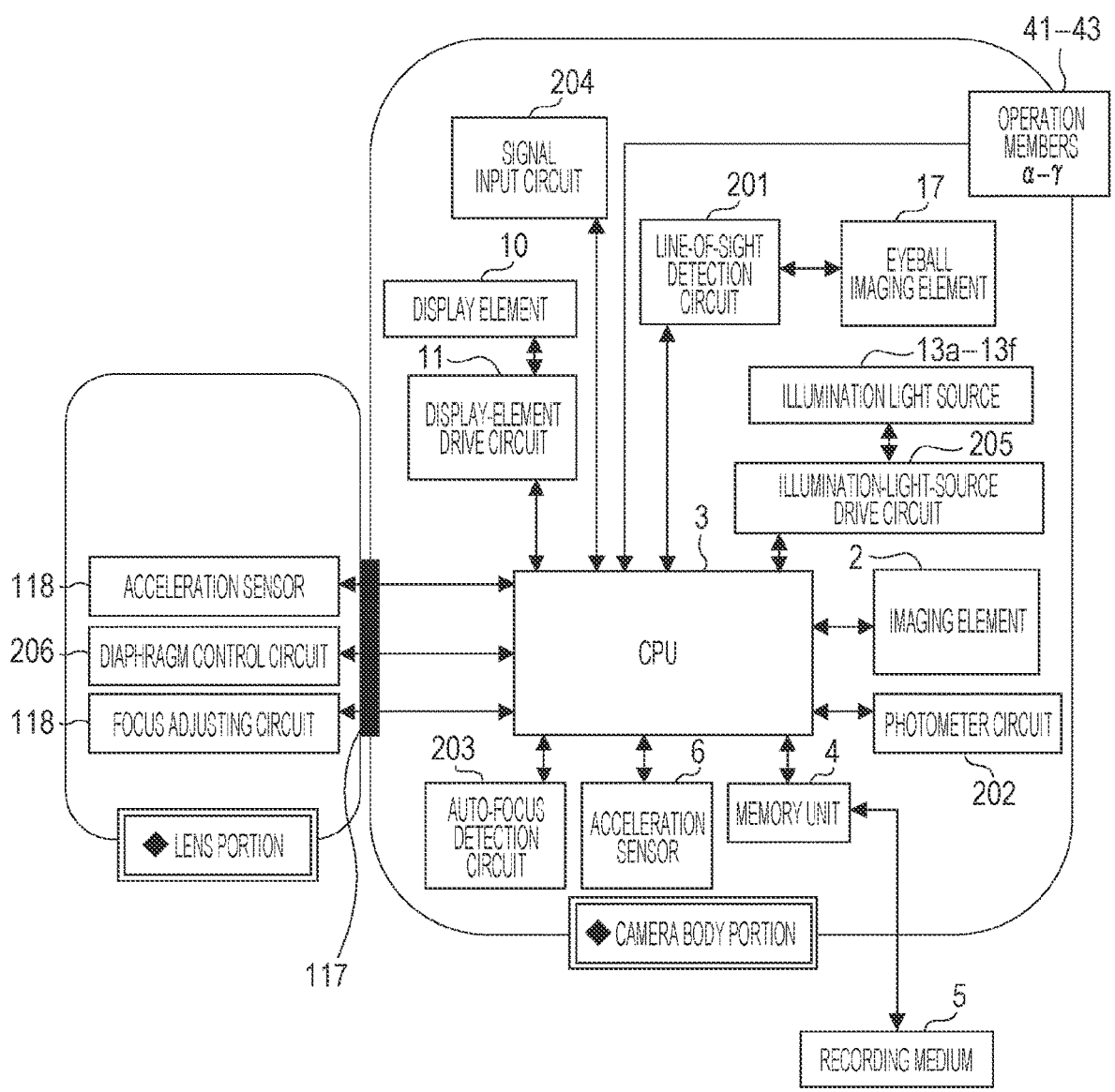
FIG. 3 is a block diagram of the image-capturing apparatus to which the first embodiment of the present invention is applied.

FIGS. 1 to 3 are diagrams illustrating a configuration of a camera according to the present exemplary embodiment.

FIGS. 2A and 2B illustrate an external appearance of a digital still camera 1 according to the present invention. FIG. 2A is a front perspective view, and FIG. 2B is a rear perspective view. In the present exemplary embodiment, as illustrated in the front perspective view of FIG. 2A, the digital still camera 1 includes an image-capturing lens 1A and a housing 1B of a camera body. The digital still camera 1 is also provided with a shutter-release button 5 which is an operation member for receiving an imaging operation from an image-capturing person (user).

As illustrated in the rear perspective view of FIG. 2B, on a rear surface of the digital still camera 1, an eyepiece lens 12 is provided through which the image-capturing person looks into a display element (to be described below) included inside the camera. In addition, various operation members used for operating the camera, such as an operation member α (touch-panel liquid crystal display), an operation member β (lever-type operation member), and an operation member γ (button-type cross key) respectively denoted by 41 to 43 are provided.

FIG. 1 is a sectional view of the camera housing taken along a YZ plane formed by a Y axis and a Z axis illustrated in FIG. 2A, and is an explanatory diagram illustrating a schematic configuration of the digital still camera 1 according to the present invention. In FIGS. 1, 2A, and 2B, corresponding portions are denoted by the same numeral.

In FIG. 1, 1A denotes the image-capturing lens for interchangeable-lens cameras. In the present embodiment, the inside of the image-capturing lens 1A is depicted with two lenses 101 and 102 for the sake of convenience. However, as is well known, the image-capturing lens 1A is constituted by a larger number of lens in practice. 1B denotes the housing of the camera body, and configurations of units included therein are as follows. 2 denotes an imaging element, which is disposed on a plane on which the image-capturing lens 1A of the digital still camera 1 is expected to form an image. The digital still camera 1 includes therein a CPU 3 that controls the entire camera, and a memory unit 4 in which an image captured by the imaging element 2 is recorded. The digital still camera 1 is also provided with a display element 10 constituted by a liquid crystal display or the like for displaying a captured image, a display-element drive circuit 11 that drives the display element 10, and the eyepiece lens 12 through which a subject image displayed on the display element 10 is observed. The imaging element 2 and the display element 10 correspond to an imaging element and display means in claim 1, respectively.

13a and 13b denote light sources that illuminate an eyeball 14 of the image-capturing person to detect a line-of-sight direction on the basis of relationships between the pupil and reflection images, resulting from corneal reflection, of the light sources used in a single-lens reflex camera or the like in the related art. The light sources 13a and 13b are constituted by infrared-emitting diodes and are arranged around the eyepiece lens 12. An eyeball image of the illuminated eyeball and images of the light sources 13a and 13b resulting from corneal reflection pass through the eyepiece lens 12, are reflected by a light separator 15, and are formed, by a light-receiving lens 16, on the eyeball imaging element 17 such as a CCD in which lines of photoelectric elements are arranged two-dimensionally. The light-receiving lens 16 positions the pupil of the eyeball 14 of the image-capturing person and the eyeball imaging element 17 to have a conjugate image-forming relationship. On the basis of the positional relationships between the images of the light sources 13a and 13b resulting from corneal reflection and the eyeball image that are formed on the eyeball imaging element 17, the line-of-sight direction is detected using a predetermined algorithm (to be described below). The eyeball imaging element 17 described above corresponds to an imaging element in claim 1.

111 denotes a diaphragm provided in the image-capturing lens 1A. 112 denotes a diaphragm drive device. 113 denotes a lens driving motor. 114 denotes a lens driving member including a driving gear and so on. 115 denotes a photocoupler, which detects rotation of a pulse board 116 that moves in conjunction with the lens driving member 114 and transmits information on the rotation to a focus adjusting circuit 118. The focus adjusting circuit 118 drives the lens driving motor 113 by a predetermined amount on the basis of this information and information on a lens driving amount supplied from the camera to move the lens 101 to an in-focus position. 117 denotes a mount contact that serves as a publicly known interface between a camera and a lens. 6 denotes an acceleration sensor built in the camera. The acceleration sensor 6 detects panning of the camera. 119 denotes an acceleration sensor built in the lens. The acceleration sensor 119 detects panning of the lens. One or both of the acceleration sensor 6 built in the camera and the acceleration sensor 119 built in the lens are used in determination of panning (to be described below).

FIG. 3 is a block diagram illustrating electrical components built in the digital still camera 1 having the foregoing configuration. The same component as that in FIG. 1 is denoted by the same numeral. The central processing unit 3 that is a microcomputer built in the camera body is hereinafter referred to as "CPU 3". A line-of-sight detection circuit 201, a photometer circuit 202, an auto-focus detection circuit 203, a signal input circuit 204, the display-element drive circuit 11, an illumination-light-source drive circuit 205, and the acceleration sensor 6 are connected to the CPU 3. Signals are delivered to the focus adjusting circuit 118 disposed in the image-capturing lens 1A, a diaphragm control circuit 206 included in the diaphragm drive device 112 described above, and the acceleration sensor 119 through the mount contact 117 illustrated in FIG. 1. The memory unit 4 attached to the CPU 3 has a function of storing imaging signals supplied from the imaging element 2 and the eyeball imaging element 17. The memory unit 4 is connected to a recording medium 7. The CPU 3 converts an imaging signal from the imaging element 2 stored in the memory unit 4 into a captured image. The captured image is then transferred to the recording medium 7.

The line-of-sight detection circuit 201 performs A/D conversion on an output based on a formed eyeball image from the eyeball imaging element 17 (CCD-EYE), and sends this image information to the CPU 3. The CPU 3 extracts feature points of the eyeball image necessary for line-of-sight detection in accordance with a predetermined algorithm (to be described below), and further calculates a line of sight of the image-capturing person on the basis of positions of the respective feature points.

The photometer circuit 202 amplifies a luminance signal output corresponding to a brightness of a subject field on the basis of a signal obtained from the imaging element 2 that also serves as a photometer sensor, performs logarithmic compression and A/D conversion on the result, and sends the result as subject field luminance information to the CPU 3.

The auto-focus detection circuit 203 performs A/D conversion on signal voltages supplied from a plurality of pixels that are included in the CCD of the imaging element 2 and are used for phase-difference detection, and sends the resultant signals to the CPU 3. The CPU 3 calculates a distance to the subject corresponding to each focus detection point on the basis of the signals of the plurality of pixels. This is a well-known technique known as imaging-plane phase-difference AF. In the present exemplary embodiment, for example, suppose that there are 180 focus detection points at positions on an imaging plane which correspond to areas indicated in an image of a field of vision within a viewfinder in FIGS. 4A and 4B.

A switch SW1 is connected to the signal input circuit 204. The switch SW1 is turned on in response to a first stroke of the shutter-release button 5 (not illustrated) to start a photometry operation, a distance measurement operation, a line-of-sight detection operation of the camera, an operation of determining a line-of-sight position of an image-capturing person, and the like. A switch SW2 is also connected to the signal input circuit 204. The switch SW2 is turned on in response to a second stroke of the shutter-release button 5 to start a shutter-release operation. The signal is input to the signal input circuit 204 and sent to the CPU 3.

The operation member α (touch-panel liquid crystal display), the operation member β (lever-type operation member), and the operation member γ (button-type cross key) described above and respectively denoted by 41 to 43 are configured to transmit operation signals thereof to the CPU 3.

Figure 4A:
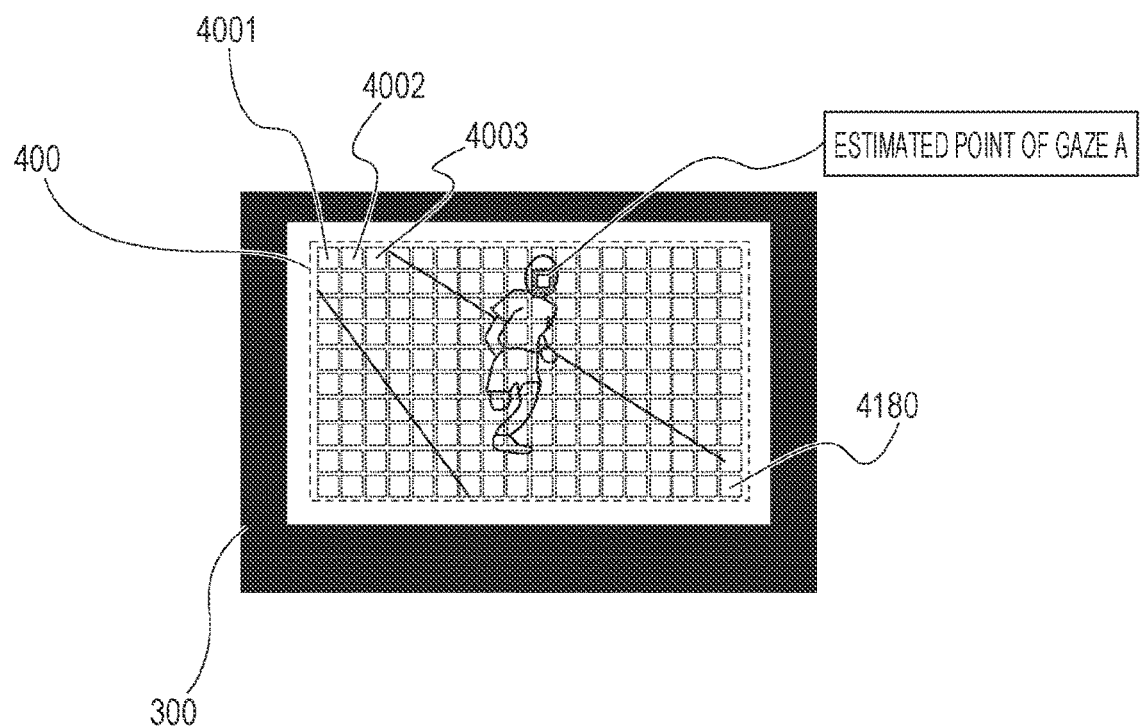
FIG. 4A is an explanatory diagram illustrating a field of vision within a viewfinder in the first embodiment of the present invention.
Figure 4B:
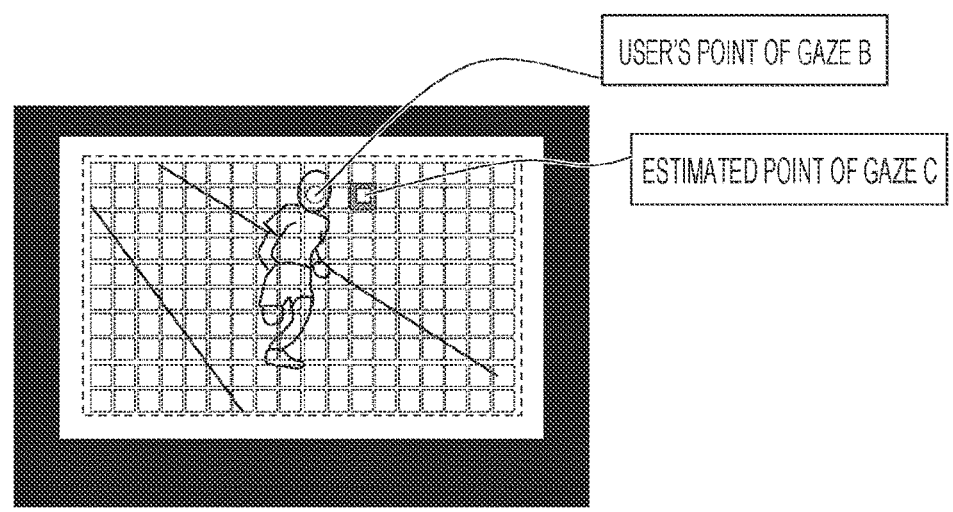
FIG. 4B is an explanatory diagram illustrating the field of vision within the viewfinder in the first embodiment of the present invention.

FIGS. 4A and 4B are diagrams illustrating a field of vision within a viewfinder and illustrate a state in which the display element 10 is in operation.

In FIGS. 4A and 4B, 300 denotes a field-of-vision mask, 400 denotes a focus detection region, and 4001 to 4180 denote 180 focus point indicators displayed over a through image displayed on the display element 10 to be superimposed at respective positions corresponding to the plurality of focus detection points on the imaging plane. An indicator corresponding to an estimated position of a current point of gaze among those indicators is displayed with a frame as indicated by an estimated point of gaze A in the figure. Displaying a frame at the estimated position of the point of gaze corresponds to displaying, on the display element, an indicator indicating a position of the point of gaze estimated by the point-of-gaze-position estimation means. The configuration in which the CPU 3 sends a signal to the display element 10 to display the frame at the estimated position of the point of gaze corresponds to point-of-gaze position display means.

Figure 5:
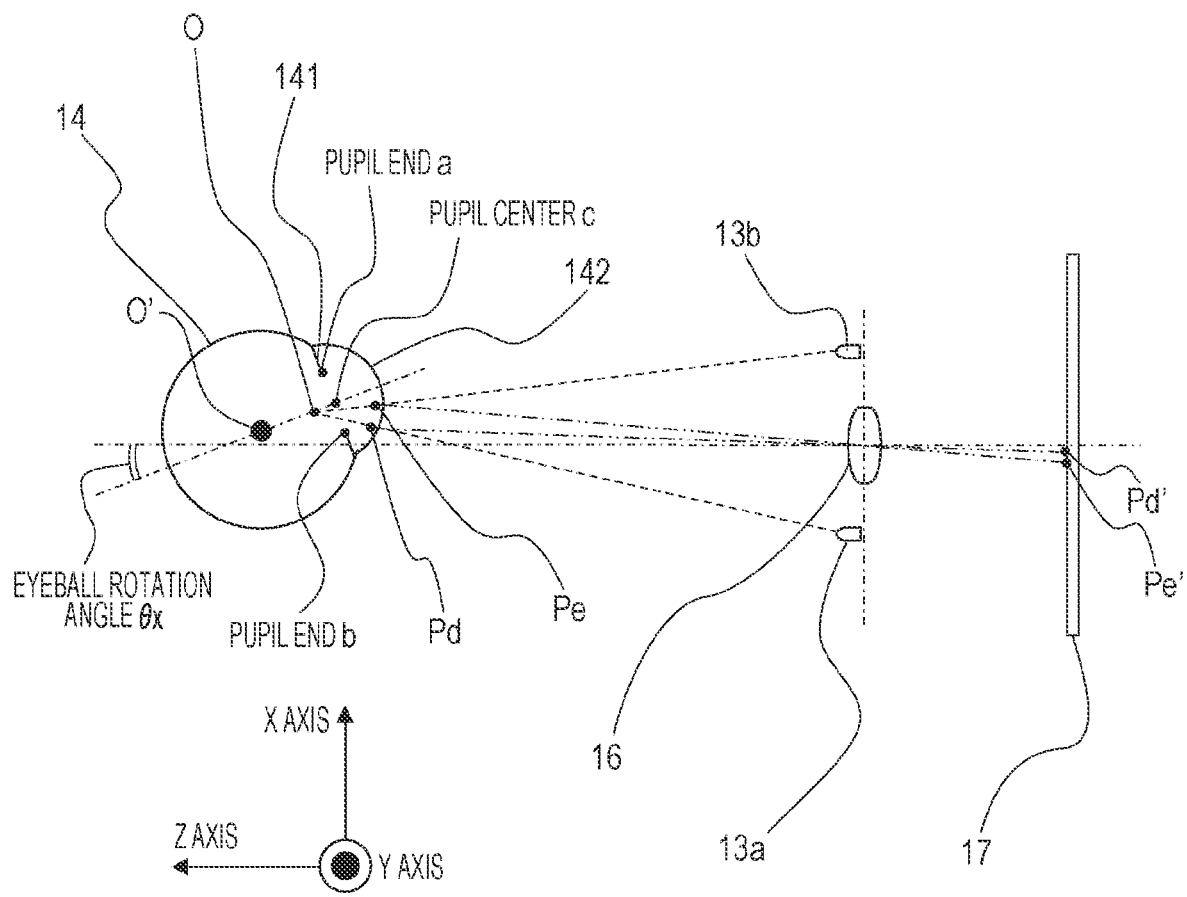
FIG. 5 is an explanatory diagram of the principle of a line-of-sight detection method in the first embodiment of the present invention.

FIG. 5 is an explanatory diagram of the principle of a line-of-sight detection method and corresponds to a simplified diagram of an optical system for performing line-of-sight detection in FIG. 1 described above.

In FIGS. 5, 13a and 13b denote light sources such as light-emitting diodes that emit infrared rays not to be sensed by an observer. The light sources 13a and 13b are disposed to be substantially symmetric about the optical axis of the light-receiving lens 16 and illuminate the eyeball 14 of the observer. Part of the illumination light reflected by the eyeball 14 is condensed onto the eyeball imaging element 17 by the light-receiving lens 16.

A line-of-sight detection method will be described below with reference to FIGS. 5 to 7.

<Description of Line-of-Sight Detection Operation>

Figure 7:
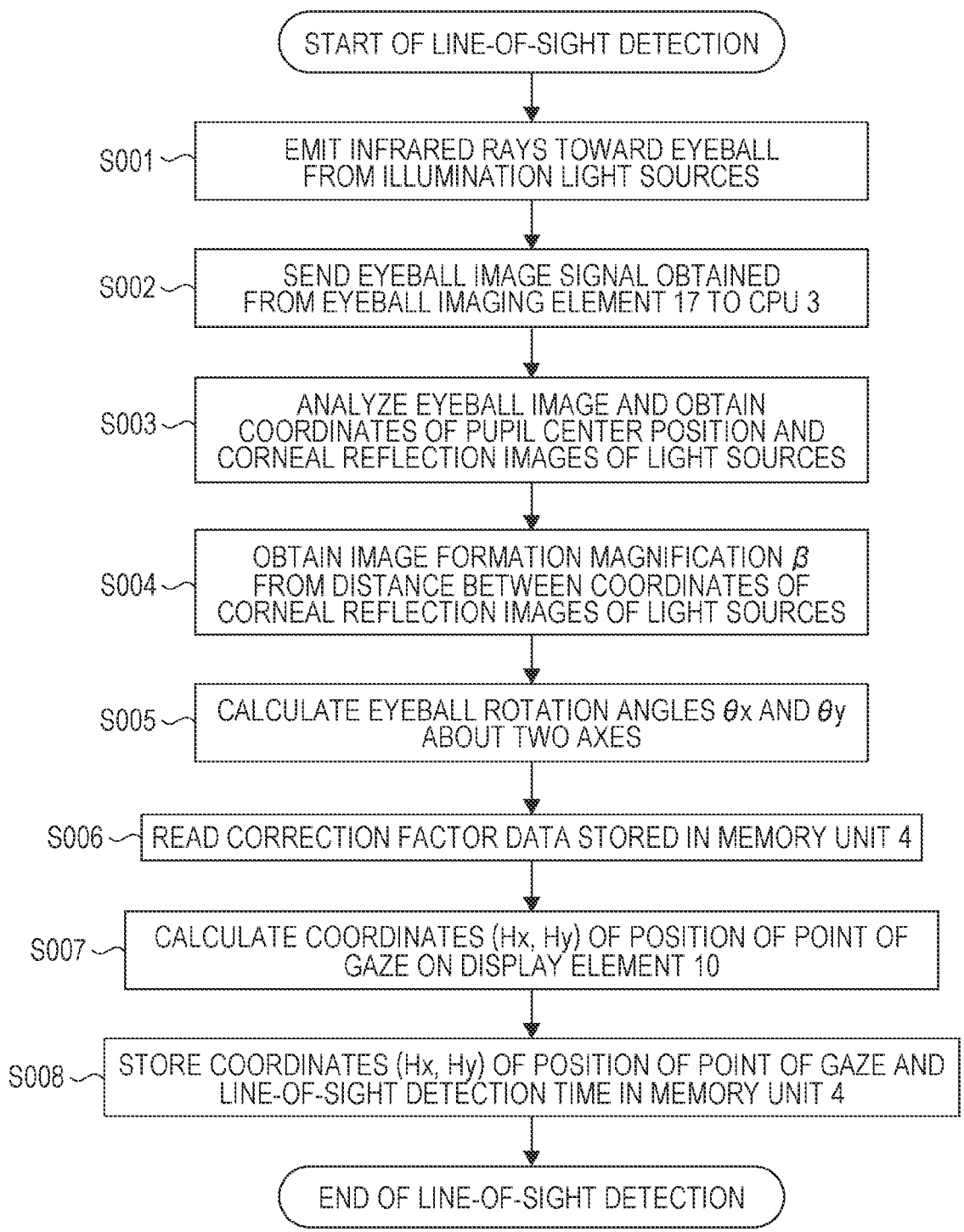
FIG. 7 illustrates a schematic flow of a line-of-sight detection routine.

FIG. 7 illustrates a schematic flow of a line-of-sight detection routine. In FIG. 7, after the line-of-sight detection routine is started, the light sources 13a and 13b emit infrared rays toward the eyeball 14 of an observer in step S001. An eyeball image of the observer illuminated with the infrared rays is formed on the eyeball imaging element 17 through the light-receiving lens 16 and is photo-electrically converted by the eyeball imaging element 17, so that the eyeball image can be processed as an electric signal.

In step S002, an eyeball image signal thus obtained from the eyeball imaging element 17 is sent to the CPU 3.

Figure 6A:
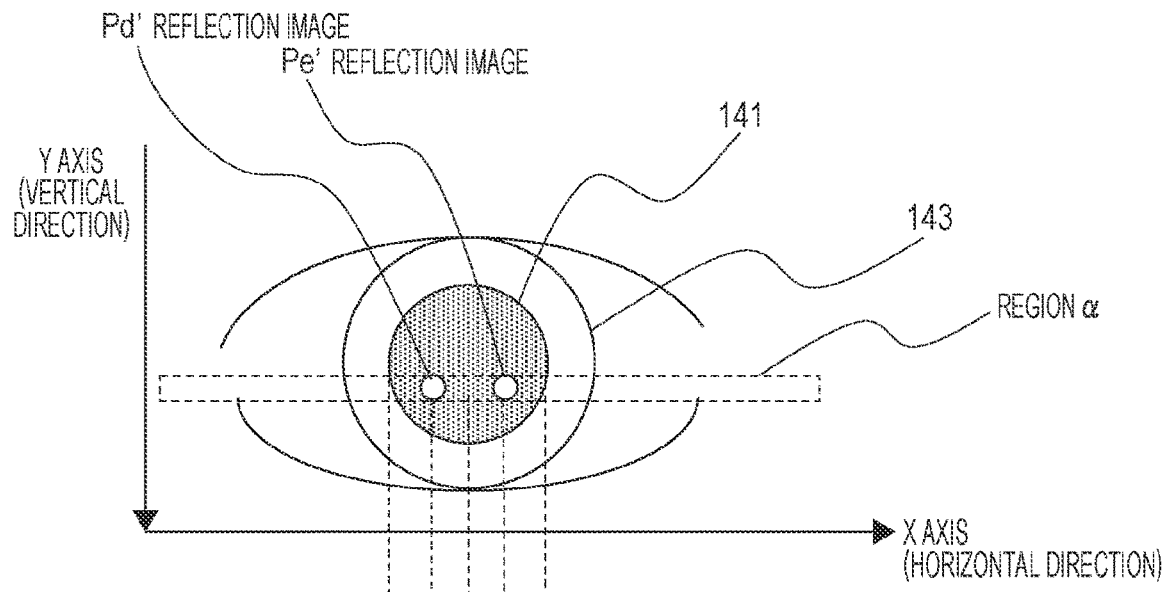
FIGS. 6A and 6B are schematic diagrams of an eyeball image projected onto an eyeball imaging element 17.
Figure 6B:
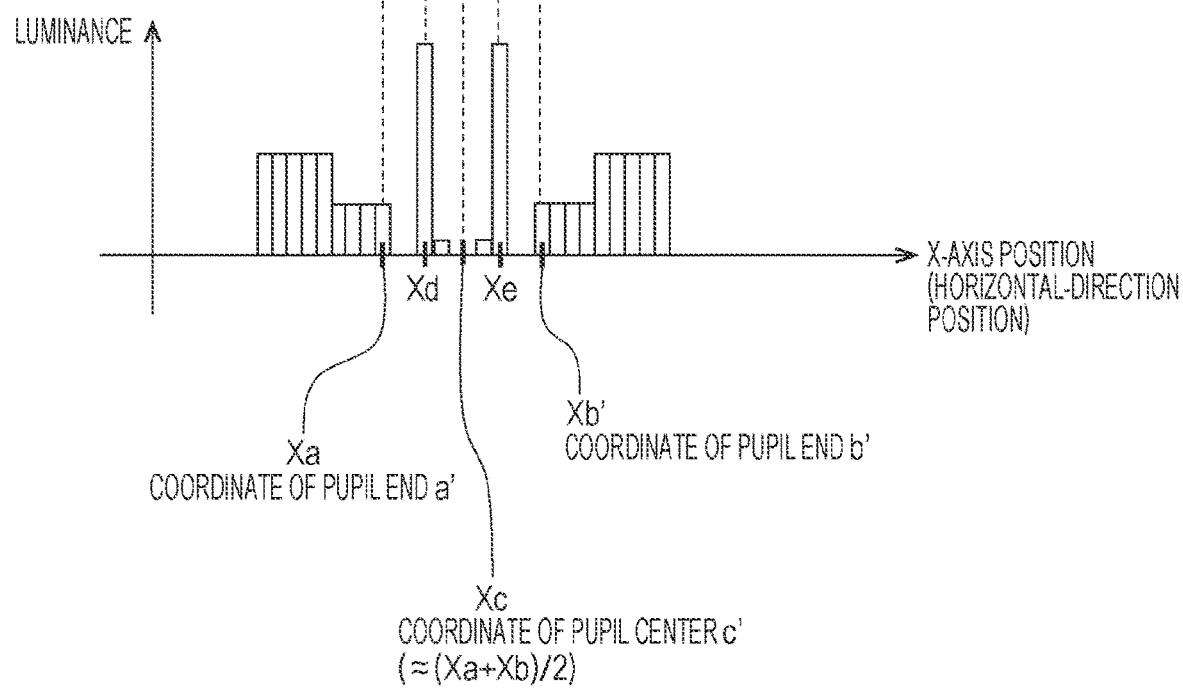

In step S003, coordinates of points corresponding to a pupil center c and corneal reflection images Pd and Pe of the light sources 13a and 13b illustrated in FIG. 5 are calculated on the basis of information of the eyeball image signal obtained in S002. The infrared rays emitted from the light sources 13a and 13b illuminate a cornea 142 of the eyeball 14 of the observer. At this time, the corneal reflection images Pd and Pe formed of the infrared rays partially reflected by the surface of the cornea 142 are condensed by the light-receiving lens 16. Consequently, the corneal reflection images Pd and Pe are formed on the eyeball imaging element 17 (points Pd' and Pe' illustrated in the figure). Likewise, light rays from end portions a and b of a pupil 141 form images on the eyeball imaging element 17. In FIGS. 6A and 6B, FIG. 6A illustrates an example image of a reflection image obtained from the eyeball imaging element 17 and FIG. 6B illustrates example luminance information, in a region a in the example image, obtained from the eyeball imaging element 17. As illustrated, the X axis denotes the horizontal direction and the Y axis denotes the vertical direction. In this case, let Xd and Xe denote coordinates, in the X-axis direction (horizontal direction), of the formed images Pd' and Pe' of the corneal reflection images of the light sources 13a and 13b, respectively. In addition, let Xa and Xb denote coordinates, in the X-axis direction, of formed images a' and b' of the light rays from the end portions a and b of the pupil 141. In the example luminance information in FIG. 6B, an extremely high luminance level is obtained at the positions Xd and Xe corresponding to the formed images Pd' and Pe' of the corneal reflection images of the light sources 13a and 13b. A region from the coordinate Xa to the coordinate Xb corresponds to the region of the pupil 141. In this region, an extremely low luminance level is obtained except at the positions Xd and Xe described above. A region with X-coordinate values less than Xa and a region with X-coordinate values greater than Xb correspond to the region of an iris 143 located on the outer side of the pupil 141. In these regions, intermediate values between the two aforementioned luminance levels are obtained. On the basis of information on the above-described change in the luminance level with respect to the X-coordinate position, the X coordinates Xd and Xe of the formed images Pd' and Pe' of the corneal reflection images of the light sources 13a and 13b and the X coordinates Xa and Xb of the images a' and b' of the pupil ends can be obtained. When a rotation angle $\theta x$ of the optical axis of the eyeball 14 relative to the optical axis of the light-receiving lens 16 is small, a coordinate Xc of the location (referred to as c') corresponding to the pupil center c in the image formed on the eyeball imaging element 17 can be represented by $Xc \approx (Xa+Xb)/2$. Thus, the X coordinate of c' corresponding to the pupil center c in the image formed on the eyeball imaging element 17 and the X coordinates of the corneal reflection images Pd' and Pe' of the light sources 13a and 13b can be estimated.

In step S004, an image formation magnification β of the eyeball image is calculated. β denotes a magnification determined in accordance with the position of the eyeball 14 relative to the light-receiving lens 16 and can be calculated as a function of an interval (Xd−Xe) between the corneal reflection images Pd' and Pe' in practice.

The X coordinate of the middle point between the corneal reflection images Pd and Pe substantially coincides with the X coordinate of the curvature center O of the cornea 142. Thus, when an average distance from the curvature center O of the cornea 142 to the center c of the pupil 141 is denoted by Oc, the rotation angle $\theta x$ of the optical axis of the eyeball 14 in the Z-X plane can be calculated on the basis of a relational expression $\beta * Oc * \sin \theta x \approx \{(Xd+Xe)/2\} - Xc$ in step S005. FIGS. 5 and 6 illustrate the example of calculating the rotation angle $\theta x$ in the case where the eyeball 14 of the observer rotates in a plane perpendicular to the Y axis. However, a method of calculating a rotation angle $\theta y$ in the case where the eyeball 14 of the observer rotates in a plane perpendicular to the X axis is substantially the same.

After the rotation angles $\theta x$ and $\theta y$ of the optical axis of the eyeball 14 of the observer are calculated in the previous step, $\theta x$ and $\theta y$ are used to calculate the position of the line of sight of the observer on the display element 10 (the position of a point gazed at by the observer, hereinafter referred to as "point of gaze") in step S006. Assuming that the position of the point of gaze is denoted by coordinates (Hx, Hy) corresponding to the center c of the pupil 141 on the display element 10, Hx and Hy can be calculated as follows.

$$Hx = m \times (Ax \times \theta x + Bx)$$

$$Hy = m \times (Ay \times \theta y + By)$$

Here, a factor m is a constant determined in accordance with the configuration of a viewfinder optical system of the camera and is a conversion factor for converting the rotation angles θx and θy into the coordinates of the position corresponding to the center c of the pupil 141 on the display element 10. The factor m is determined in advance and stored in the memory unit 4. In addition, Ax, Bx, Ay, and By are line-of-sight correction factors for correcting an individual difference in the line of sight of the observer, are obtained by performing a calibration operation, and are stored in the memory unit 4 before the line-of-sight detection routine is started.

After the coordinates (Hx, Hy) of the center c of the pupil 141 on the display element 10 are calculated in the above-described manner, the above-described coordinates (hereinafter, referred to as "coordinates of the position of the point of gaze") and the obtained time of the eyeball image signal (hereinafter, referred to as "line-of-sight detection time") are stored in the memory unit 4 in step S008. Then, the line-of-sight detection routine ends.

The method of obtaining the coordinates of the point of gaze on the display element by using the corneal reflection images of the light sources 13a and 13b has been described above. However, the method is not limited to this one, and any method of obtaining the eyeball rotation angles from a captured eyeball image is applicable to the present invention.

The line-of-sight detection routine described above corresponds to point-of-gaze-position estimation means.

<Description of Point-of-Gaze-Position Confirmation Operation>

Two-step pressing operations can be performed on the shutter-release button 5. In response to the first stroke, which is a half pressing operation (hereinafter, referred to as SW1), an instruction for an AF operation can be issued. In response to the second stroke, which is a fully pressing operation (hereinafter, referred to as SW2), shutter-releasing can be performed. The shutter-release button 5 includes a function of determining the position of the point of gaze in accordance with an intention of the image-capturing person (hereinafter, referred to as line-of-sight confirmation) before the AF operation is performed in response to the SW1 operation. This allows AF operation to be performed at the determined position of the point of gaze. The point-of-gaze position information confirmed through the line-of-sight confirmation may be coordinates of the position of the point of gaze or the detection time of the determined position of the point of gaze. The point-of-gaze position information just needs to allow a timing at which the point-of-gaze coordinates are detected in the line-of-sight detection routine and a timing at which the point-of-gaze coordinates are determined in accordance with the intention of the image-capturing person to be distinguished from each other. The coordinates of the position of the point of gaze determined through the line-of-sight confirmation or the confirmation timing is stored in the memory unit 4.

In addition, the line-of-sight confirmation function similar to the SW1 operation may be assigned to any of the above-described operation members α to γ respectively denoted by 41 to 43. The line-of-sight confirmation function corresponds to point-of-gaze-position confirmation means.

<Description of Association Operation to Still Image or Moving Image>

Line-of-sight-detection-information recording means and confirmed-point-of-gaze-information recording means will be described next with reference to FIG. 8.

After line-of-sight detection-information recording is started, line-of-sight detection is performed in step S101. The line-of-sight detection in step S101 corresponds to steps S001 to S007 described above. After the position of the point of gaze is calculated in step S101, the coordinates of the position of the point of gaze and the line-of-sight detection time are stored in the memory unit 4 in step S102. The process then proceeds to step S103. S102 corresponds to S008 described above and the line-of-sight-detection-information recording means.

If the position of the point of gaze is determined by the SW1 operation or an operation performed by the image-capturing person on any of the operation members α to γ respectively denoted by 41 to 43 in S103, coordinates of the point of gaze determined in accordance with the operation performed by the image-capturing person or the line-of-sight detection time is stored in the memory unit 4 in step S104. S104 corresponds to the confirmed-point-of-gaze-information recording means. If the position of the point of gaze is not confirmed in step S103, the process proceeds to step S105.

In S105, it is determined whether the current mode is a still image capturing mode or a moving image capturing mode. The still image capturing mode and the moving image capturing mode can be switched between by using various operation members used for operating the camera. The various operation members used herein are, for example, the operation member α (touch-panel liquid crystal display), the operation member β (lever-type operation member), and the operation member γ (button-type cross key) respectively denoted by 41 to 43 in FIG. 2B.

In the case of the still image capturing mode, the process proceeds to S106. In S106, it is determined whether the shutter is released in response to the SW2 operation. If the shutter is not released, the process returns to the S101 and the line-of-sight detection is repeated. If the confirmation operation of the position of the point of gaze is performed multiple times in S103 before the process reaches S105, the point-of-gaze coordinates or the line-of-sight detection time obtained at the latest confirmation of the point of gaze in the memory unit 4 is updated in S104.

If the shutter-release button 5 is pressed in step S106, the process proceeds to step S107. In step S107, the CPU 3 records, in the recording medium 7 together with data of the captured still image, the coordinates of the position of the point of gaze and the line-of-sight detection time stored in S102 and the point-of-gaze coordinates or the line-of-sight detection time obtained when the point of gaze is confirmed and stored in S104.

If it is determined in S105 that the current mode is the moving image capturing mode, the process proceeds to S108. In S108, it is determined whether capturing of a moving image is ended. If the capturing of the moving image is not ended, the process returns to S101 and the line-of-sight detection is repeated. As in the still image mode, if the confirmation operation of the position of the point of gaze is performed multiple times in S103 before the process reaches S105, the point-of-gaze coordinates or the line-of-sight detection time obtained at the latest confirmation of the point of gaze in the memory unit 4 is updated in S104.

If it is determined in step S108 that capturing of the moving image is ended, the process proceeds to step S109. In step S109, the CPU 3 records, in the recording medium 7 together with data of the captured moving image, the coordinates of the position of the point of gaze and the line-of-sight detection time stored in S102 and the point-of-gaze coordinates or the line-of-sight detection time obtained when the point of gaze is confirmed and stored in S104.

Since S101 and the S102 are repeated until the line-of-sight detection is ended, the coordinates of the position of the point of gaze and the line-of-sight detection time are accumulated as a plurality of pieces of past line-of-sight detection information in the memory unit 4. Thus, when the shutter-release button 5 is pressed in S106 or when capturing of the moving image is ended in S108, the plurality of past line-of-sight detection results are recorded in association with captured image data of the still image.

Second Exemplary Embodiment

In a second exemplary embodiment that is a modification of the first exemplary embodiment, a method of recording, in the recording medium 7, the plurality of pieces of past line-of-sight detection information recorded in step S107 of FIG. 8 without any overlap will be described with reference to FIG. 9.

Figure 8:
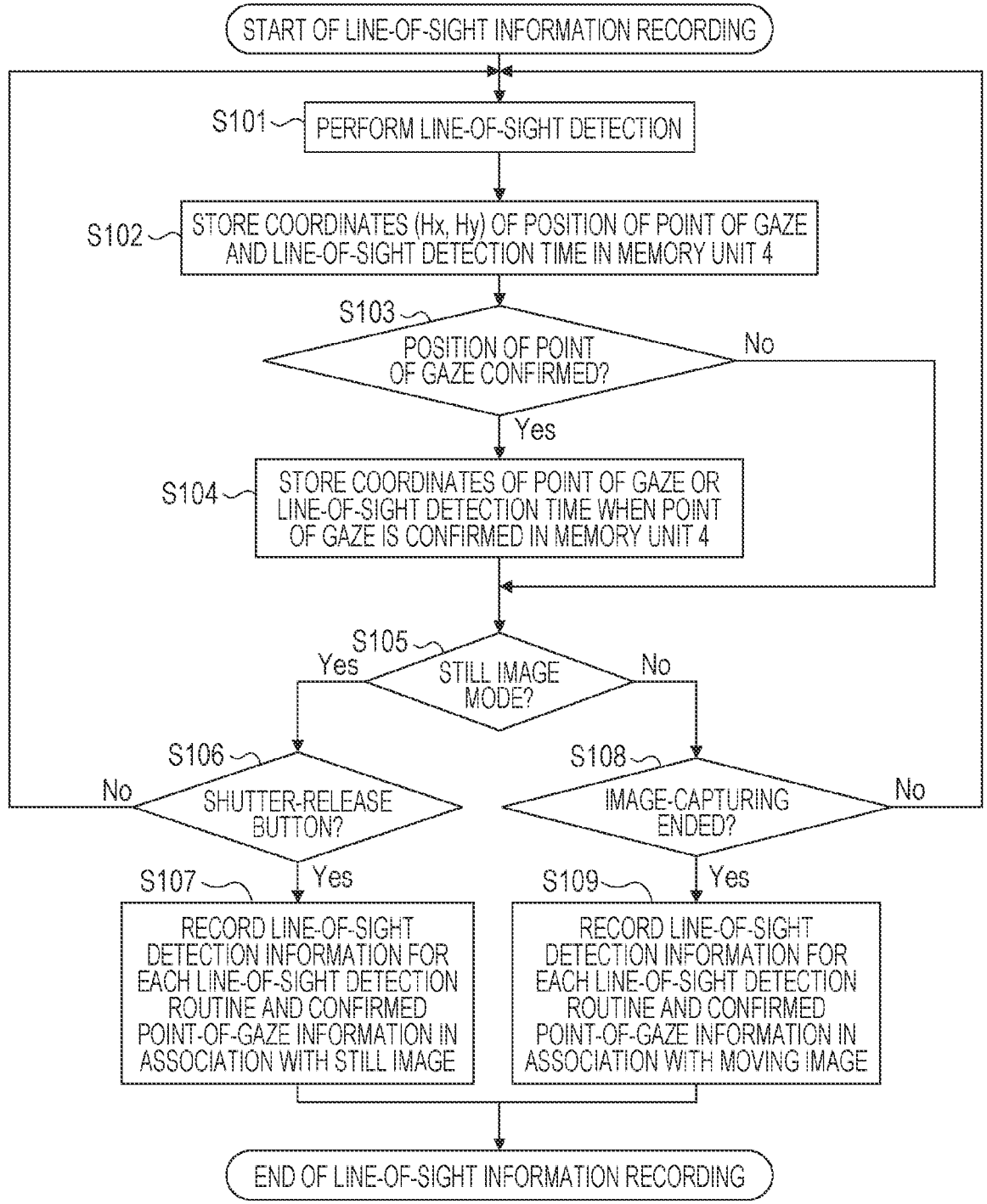
FIG. 8 illustrates a schematic routine of recording confirmed point-of-gaze information and line-of-sight detection information in the first embodiment of the present invention.

In S107 of FIG. 8 in the first exemplary embodiment described above, the plurality of pieces of past line-of-sight detection information are recorded in a fixed size since the size recordable in association with a still image is usually finite. In this case, the plurality of pieces of past line-of-sight detection information accumulated until the shutter is released in response to the SW2 operation are recorded a fixed number of times.

However, if the plurality of pieces of past line-of-sight detection information are recorded the fixed number of times even during continuous image capturing, the plurality of pieces of past line-of-sight detection information added to the previous captured image data may have an overlap. For example, suppose that ten line-of-sight detection results can be added to one piece of captured image data. In the case where the line-of-sight detection routine can be performed five times during continuous image capturing, the five pieces of line-of-sight detection information overlap between the previous one and the current one. The five pieces of past line-of-sight detection information for the current captured image data can be checked using the previous captured image. Thus, redundancy occurs in the recorded data. In view of a transfer time of the line-of-sight detection information from the memory unit 4 to the recording medium 7 and a recordable capacity of the recording medium 7, the information to be associated with the captured image data is desirably minimized.

Figure 9:
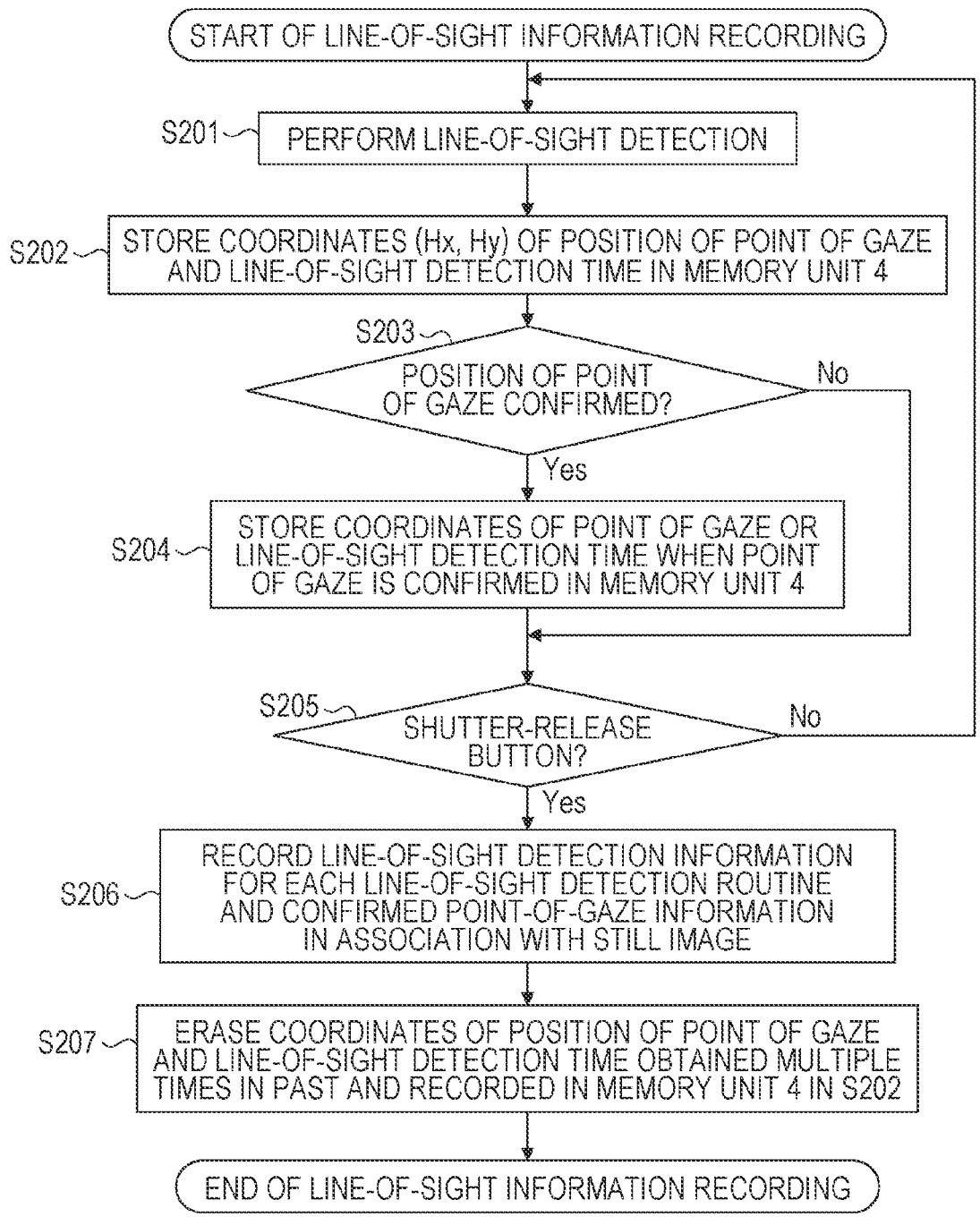
FIG. 9 illustrates a schematic routine of recording confirmed point-of-gaze information and line-of-sight detection information in a second embodiment of the present invention.

FIG. 9 will be described below.

Since steps S201 to S206 of FIG. 9 are equivalent to steps S101 to S104, S106, and S107 of FIG. 8, a description thereof is omitted. After the line-of-sight detection information stored in step S202 and the confirmed point-of-gaze information stored in step 204 are added to the captured image data in step S206, the process proceeds to step S207. In S207, the coordinates of the position of the point of gaze and the line-of-sight detection time obtained multiple times in the past and recorded in the memory unit 4 in S202 are erased.

According to FIG. 9, in the case of continuous image capturing, the line-of-sight detection results detected in the next line-of-sight detection routine are recorded in the memory unit 4 that has been cleared. Thus, the plurality of past line-of-sight detection results added to a captured image when the shutter is released next time do not overlap with the plurality of past line-of-sight detection results recorded for the previous one.

The second exemplary embodiment corresponds to an image-capturing apparatus.

Third Exemplary Embodiment

In a third exemplary embodiment that is a modification of the first and second exemplary embodiments, a method of storing confirmed point-of-gaze information stored in the memory unit 4 in S104 of FIG. 8 or S204 of FIG. 9 will be described with reference to FIG. 10.

The point-of-gaze coordinates or the line-of-sight detection time (hereinafter, referred to as confirmed line-of-sight information) obtained when the point of gaze is confirmed and stored in the memory unit 4 in S104 of FIG. 8 or S204 of FIG. 9 may overlap a plurality of pieces of past line-of-sight detection information stored in S102 of FIG. 8 or S202 of FIG. 9. As described in the second exemplary embodiment, in view of the transfer time of the line-of-sight detection information from the memory unit 4 to the recording medium 7 and the recordable capacity of the recording medium 7, the line-of-sight detection information is desirably recorded in the recording medium 7 after eliminating the overlapping line-of-sight detection information as much as possible. Accordingly, it is conceived to reduce the confirmed line-of-sight information that overlaps any of the plurality of pieces of past line-of-sight detection information to a minimum amount and add, to captured image data, only data that can identify the confirmed line-of-sight information from among the plurality of pieces of past line-of-sight detection information.

Figure 10:
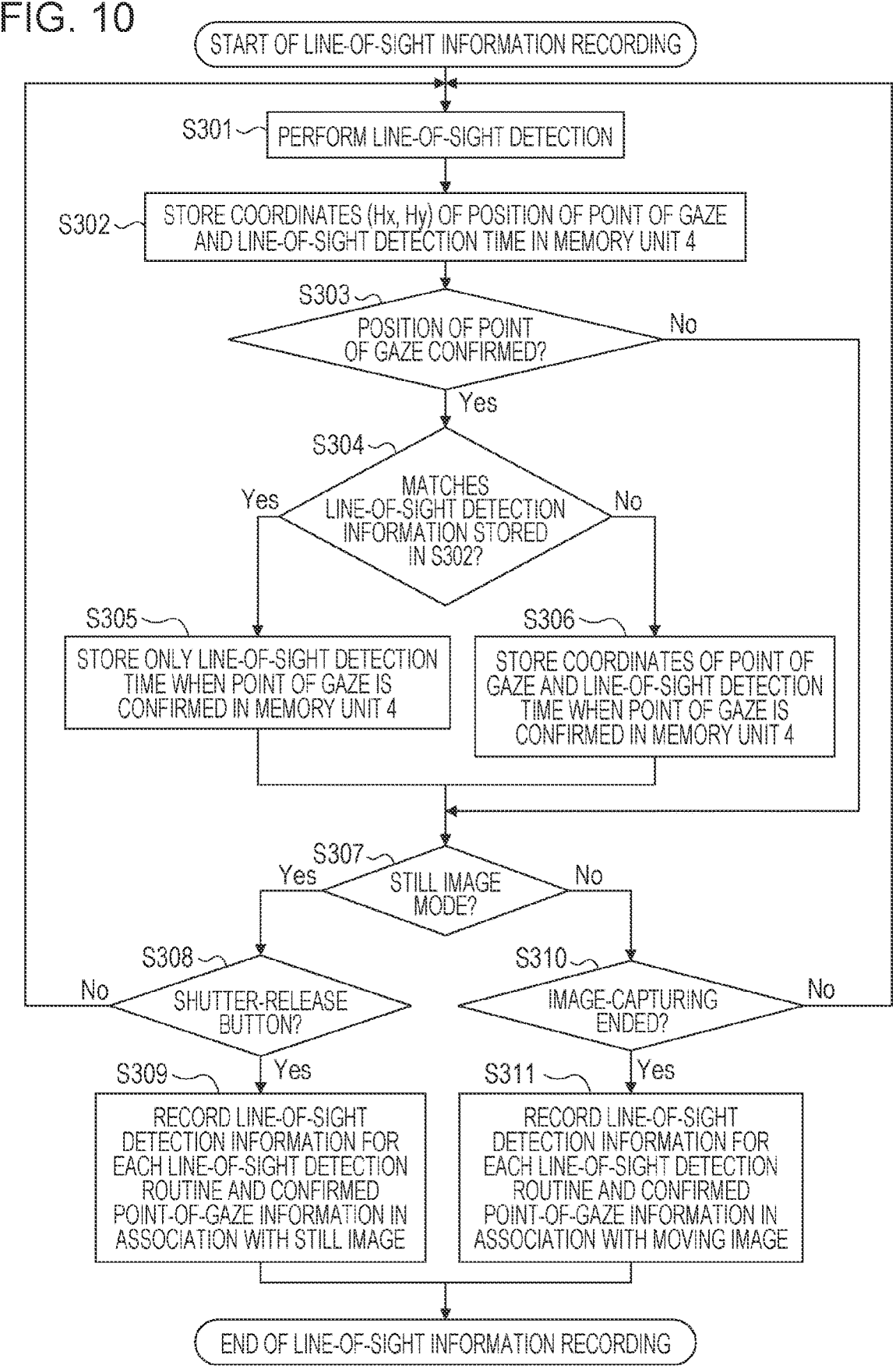
FIG. 10 illustrates a schematic routine of recording confirmed point-of-gaze information and line-of-sight detection information in a third embodiment of the present invention.

FIG. 10 is a diagram for describing a method of storing the confirmed line-of-sight information. Since steps S301 to S303 are substantially the same as steps S101 to S103 in the first exemplary embodiment, a description thereof is omitted.

If the position of the point of gaze is determined in step S303, the process proceeds to step S304, in which it is determined whether there is point-of-gaze position information that matches any of the plurality of pieces of past line-of-sight detection information stored in S302. If there is point-of-gaze position information that matches any of the plurality of pieces of past line-of-sight detection information in S304, the process proceeds to step S305, in which only the line-of-sight detection time at the time of the line-of-sight confirmation is stored in the memory unit 4. If the point-of-gaze position information does not match any of the plurality of pieces of past line-of-sight detection information in S304, the process proceeds to step S306, in which both the point-of-gaze coordinates and the line-of-sight detection time at the time of the line-of-sight confirmation are stored in the memory unit 4. After each of steps S305 and S306 is performed, the process proceeds to step S307. Since S307 to S311 are substantially the same as S105 to S109 in FIG. 8, a description thereof is omitted. The third exemplary embodiment corresponds to an image-capturing apparatus.

Fourth Exemplary Embodiment

In a fourth exemplary embodiment, information recorded by the confirmed-point-of-gaze-information recording means and the line-of-sight-detection-information recording means will be described.

As described in the second exemplary embodiment, in view of the transfer time of the line-of-sight detection information from the memory unit 4 to the recording medium 7 and the recordable capacity of the recording medium 7, a minimum amount of information is desirably stored in association with captured image data.

However, since the confirmed point-of-gaze information desirably recorded by the confirmed-point-of-gaze-information recording means is point-of-gaze information at a timing determined in accordance with the intention of the image-capturing person, it is desired to record more detailed information of line-of-sight information at the confirmation timing and provide the information to a third party or use the information for analysis. Recording more detailed information of the confirmed line-of-sight information than the line-of-sight detection information achieves both addition of a minimum amount of information to captured image data and making information at the confirmation timing more detailed.

Specifically, the confirmed point-of-gaze information and the line-of-sight detection information are, but not limited to, as follows.

Figure 11:
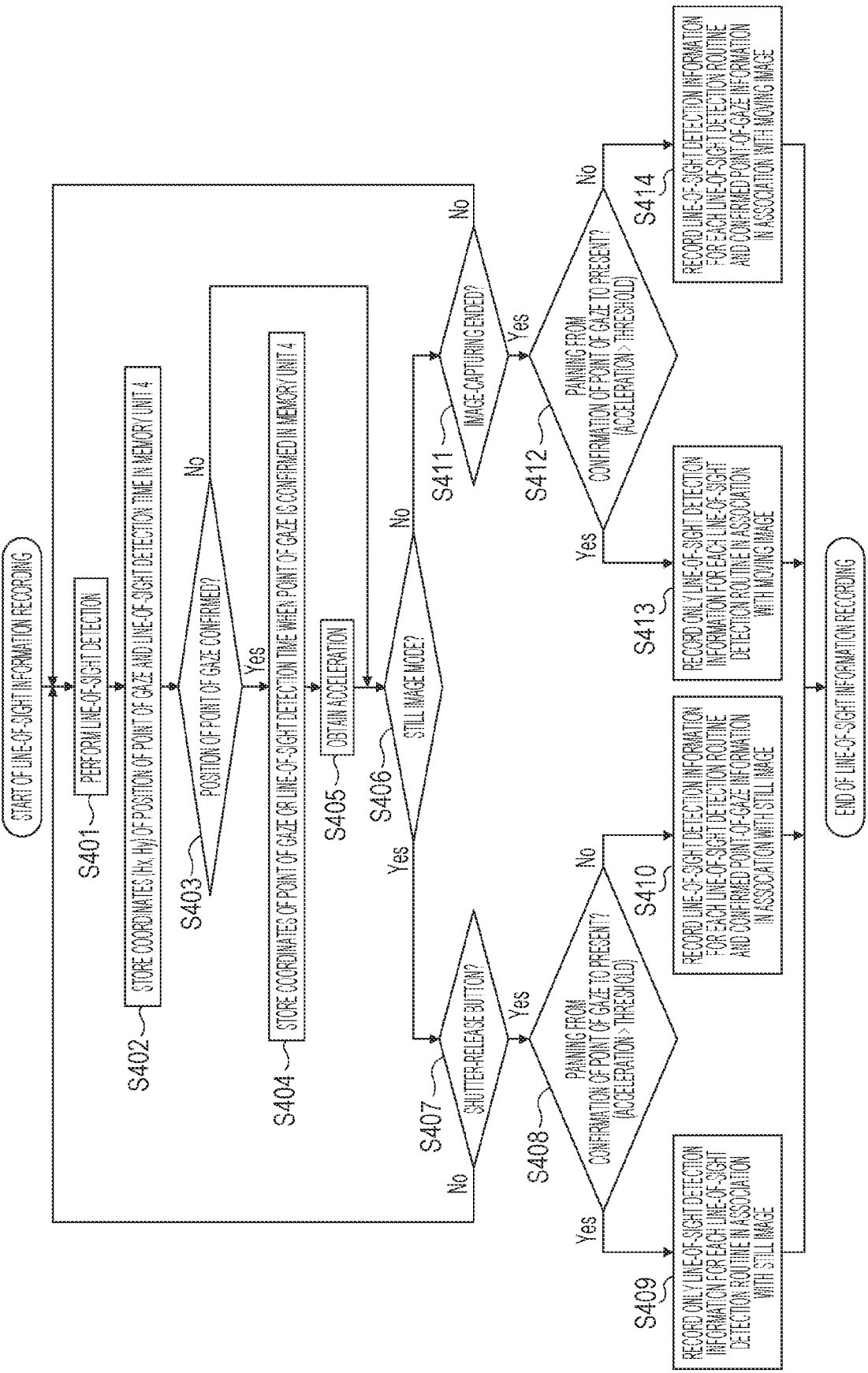
FIG. 11 illustrates a schematic routine of recording confirmed point-of-gaze information and line-of-sight detection information in a fifth embodiment of the present invention.

Confirmed point-of-gaze information: point-of-gaze coordinates, line-of-sight detection time, line-of-sight variation degree, blink information, line-of-sight angular velocity, and leap (great jump of the line of sight to another subject) determination information Line-of-sight detection information (plurality of pieces of past information are held): point-of-gaze coordinates, line-of-sight detection time Fifth Exemplary Embodiment A fifth exemplary embodiment will be described with reference to FIG. 11.

As described in the first exemplary embodiment, the point-of-gaze-position confirmation means is a means used for determining the position gazed at by the image-capturing person. The confirmed-point-of-gaze-information recording means records the position of the point of gaze determined by the point-of-gaze-position confirmation means in the recording medium 7 together with captured image data.

Since the timing of the operation performed by the point-of-gaze-position confirmation means is different from the shutter-release timing, the detection timing of the position of the point of gaze determined by the point-of-gaze-position confirmation means may greatly deviate from the generation timing of the captured image data. In this case, if the scene being captured is changed due to movement of the camera in a period from line-of-sight confirmation to shutter-releasing, the scene at the time of the line-of-sight confirmation is not left as captured image data. Thus, the confirmed line-of-sight information becomes useless. Therefore, in the case where the camera is panned, the coordinates and the detection time obtained at the line-of-sight confirmation are not recorded in the memory unit 4.

The flow will be described below with reference to FIG. 11.

Since steps S401 to S404 are substantially the same as steps S101 to S104 of FIG. 8 in the first exemplary embodiment, a description thereof is omitted.

After step S404 is performed, the process proceeds to step S405, in which an acceleration is obtained. The acceleration is obtained from the acceleration sensor 6 in the camera or the acceleration sensor 119 in the lens.

If the position of the point of gaze is not confirmed yet, the process proceeds to step S406. Since S406 and S407 are substantially the same as S105 and S106 of FIG. 8 in the first exemplary embodiment, a description thereof is omitted.

In step S408, it is determined whether the camera is panned in a period from the line-of-sight confirmation to the present. Whether the camera is panned in the period from the line-of-sight confirmation to the present is determined in accordance with whether the acceleration is greater than a threshold by using the acceleration obtained in S405. If the acceleration is greater than the threshold, it is determined that the camera is panned in the period from confirmation of the point of gaze to the present, and the process proceeds to step S409.

In S409, only the plurality of pieces of past line-of-sight detection information are recorded in the recording medium 7 in association with still image data.

On the other hand, if it is determined in step S408 that the acceleration is equal to or smaller than the threshold, it is determined that the camera is not panned in the period from confirmation of the point of gaze to the present. Thus, the process proceeds to step S410, in which both the plurality of pieces of past line-of-sight detection information and the confirmed point-of-gaze information are recorded in the recording medium 7 in association with the still image data.

If it is determined in step S406 that the current mode is the moving image capturing mode, the process proceeds to step S411, in which it is determined whether image capturing is ended. If image capturing is not ended in S411, the process returns to S401 and the line-of-sight detection is repeated. If image capturing is ended in S411, the process proceeds to step S412.

In step S412, it is determined whether the camera is panned in a period from the line-of-sight confirmation to the present. Whether the camera is panned in the period from the line-of-sight confirmation to the present is determined in accordance with whether the acceleration is greater than the threshold by using the acceleration obtained in S405. If the acceleration is greater than the threshold, it is determined that the camera is panned in the period from confirmation of the point of gaze to the present, and the process proceeds to step S413.

In S413, only the plurality of pieces of past line-of-sight detection information are recorded in the recording medium 7 in association with moving image data.

On the other hand, if it is determined in step S412 that the acceleration is equal to or smaller than the threshold, it is determined that the camera is not panned in the period from confirmation of the point of gaze to the present. Thus, the process proceeds to step S414, in which both the plurality of pieces of past line-of-sight detection information and the confirmed point-of-gaze information are recorded in the recording medium 7 in association with the moving image data.

As described above, according to the fifth exemplary embodiment, meaningful point-of-gaze position information can be recorded in association with captured image data.

Sixth Exemplary Embodiment

A sixth embodiment is a modification of the fifth exemplary embodiment and corresponds to an image-capturing apparatus according to claim 7. In the fifth exemplary embodiment, the description has been given of whether to associate the confirmed point-of-gaze information with captured image data in accordance with whether the camera is panned in a period from line-of-sight confirmation to shutter-releasing.

On the other hand, in the case of an image capturing method in which a subject desirably captured is kept within an angle of view while the camera is being panned as in a panning shot mode, it is highly likely that a relative positional relationship between the subject and the position of the point of gaze at the time of the line-of-sight confirmation does not change although the camera is being panned. In this case, it is highly likely that the position of the point of gaze determined by the point-of-gaze-position confirmation means for captured image data is meaningful information. Thus, the position of the point of gaze needs to be associated with the captured image data.

Figure 12:
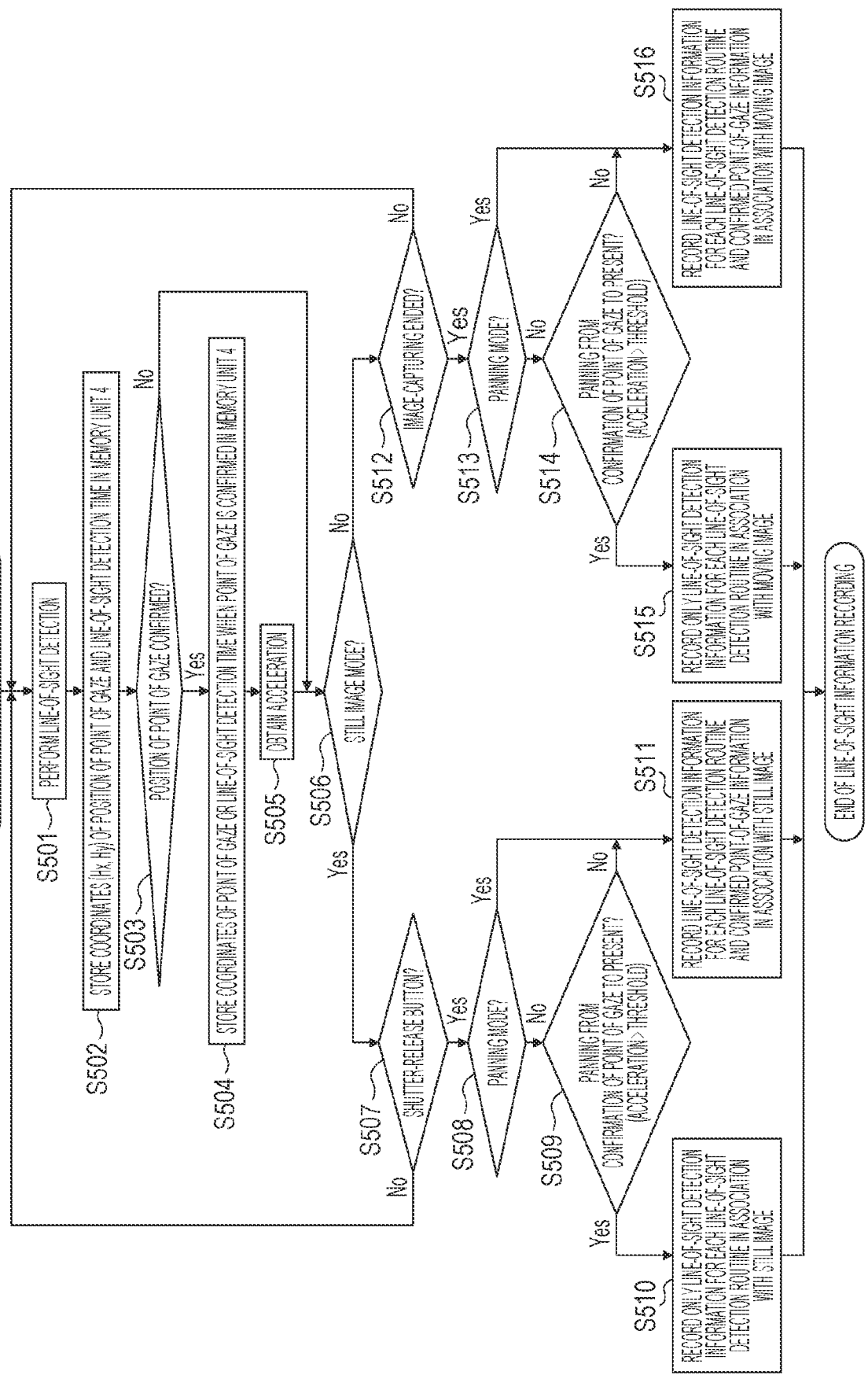
FIG. 12 illustrates a schematic routine of recording confirmed point-of-gaze information and line-of-sight detection information in a sixth embodiment of the present invention.

FIG. 12 is a flowchart illustrating association of the point-of-gaze position information at the time of confirmation of the position of the point of gaze with captured image data in the panning shot mode. The flow will be described below.

Since steps S501 to S507 are substantially the same as S401 to S407 of FIG. 11 in the fifth exemplary embodiment and step S512 is substantially the same as S411 of FIG. 11, a description thereof is omitted.

If it is determined in step S508 that the current mode is the panning shot mode, the process proceeds to step S511, in which both the plurality of pieces of past line-of-sight detection information and the confirmed line-of-sight information are recorded in the recording medium 7 in association with still image data.

On the other hand, if it is not determined that the current mode is the panning shot mode, the process proceeds to step S509.

A setting of the panning shot mode can be made by using various operation members used for operating the camera, such as the operation member α (touch-panel liquid crystal display), the operation member β (lever-type operation member), and the operation member γ (button-type cross key) respectively denoted by 41 to 43 in FIG. 2B.

Since S509 to S511 are substantially the same as S408 to S410 described in the fifth exemplary embodiment, a description thereof is omitted.

If it is determined in step S513 that the current mode is the panning shot mode, the process proceeds to step S516, in which both the plurality of pieces of past line-of-sight detection information and the confirmed line-of-sight information are recorded in the recording medium 7 in association with moving image data.

On the other hand, if it is not determined that the current mode is the panning shot mode, the process proceeds to step S514.

Since S514 to S516 are substantially the same as S412 to S414 described in the fifth exemplary embodiment, a description thereof is omitted.

As described above, according to the sixth exemplary embodiment, meaningful point-of-gaze position information can be recorded in association with captured image data in the case of the panning shot mode.

Seventh Exemplary Embodiment

In a seventh exemplary embodiment, detection information recorded in the memory unit 4 by the line-of-sight-detection-information recording means and the confirmed-point-of-gaze-information recording means is recorded in association with still image data or moving image data only when the point-of-gaze-position estimation means is enabled.

The point-of-gaze-position estimation means can be switched between enabled and disabled by using various operation members used for operating the camera. The various operation members are, for example, the operation member α (touch-panel liquid crystal display), the operation member β (lever-type operation member), and the operation member γ (button-type cross key) respectively denoted by 41 to 43 in FIG. 2B.

Note that although the configuration of the camera has been mainly described in the exemplary embodiments above, the processes described in the exemplary embodiments above can also be applied to other apparatuses. The apparatuses may be, for example, a head-mounted display, or may be a recording system in which a configuration for detecting a line of sight, a configuration for displaying an image, a configuration for confirming a point of gaze, and a configuration for recording an image and other information are implemented by separate apparatuses.

Although the preferred embodiments of the present invention have been described above, the present invention is not limited to these embodiments, and various modifications and changes can be made within the scope of the gist of the present invention.

The present invention is not limited to the embodiments described above, and various changes and modifications can be made without departing from the spirit and scope of the present invention. Accordingly, the following claims are appended to disclose the scope of the invention.

According to the present invention, an intention of an image-capturing person can be reflected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A control device comprising:
an imaging element configured to obtain an eyeball image of a user; and
at least one memory storing instructions; and
at least one processor that, upon execution of the stored instructions, is configured to:
calculate, from the eyeball image obtained from the imaging element, a point of gaze corresponding to a line of sight of the user onto a display on which a still image or a moving image is displayed;
receive an operation performed by the user to perform a confirmation operation for confirming a point of gaze; and
control, based on presence or absence of panning during capturing of the still image or the moving image, an operation of storing information related to the confirmation operation in association with the still image or the moving image displayed on the display in a case where the confirmation operation is performed by the user.

2. The control device according to claim 1, wherein the information related to the confirmation operation includes position information of the point of gaze of the user at a performed timing of the confirmation operation.

3. The control device according to claim 2, wherein the position information of the point of gaze is information of coordinates corresponding to the point of gaze.

4. The control device according to claim 1, wherein the information related to the confirmation operation includes information corresponding to a performed time of the confirmation operation.

5. The control device according to claim 1, wherein execution of the stored instructions further configures the at least one processor to record, in addition to the information related to the confirmation operation, a plurality of pieces of line-of-sight detection information in association with the still image or the moving image.

6. The control device according to claim 5, wherein each of the plurality of pieces of line-of-sight detection information includes position information of a point of gaze and information on an obtained time of the position information.

7. An image-capturing apparatus comprising the control device according to claim 1, wherein the information related to the confirmation operation is not recorded in a case where the image-capturing apparatus is panned at a performed timing of the confirmation operation.

8. The image-capturing apparatus according to claim 7, wherein the information related to the confirmation operation is recorded in association with the still image or the moving image in a case where the image-capturing apparatus is panned but a panning shot is performed by the user using the image-capturing apparatus.

9. A control method for a control device including an imaging element configured to obtain an eyeball image of a user, the control method comprising:

a calculation step of calculating, from the eyeball image obtained from the imaging element, a point of gaze corresponding to a line of sight of the user onto display on which a still image or a moving image is displayed;

an operation step of receiving an operation performed by the user to perform a confirmation operation for confirming a point of gaze; and a control step of controlling, based on presence or absence of panning during capturing of the still image or the moving image, an operation of storing information related to the confirmation operation in association with the still image or the moving image displayed on the display in a case where the confirmation operation is performed by the user.

10. A control system comprising:

an imaging element configured to obtain an eyeball image of a user;

at least one memory storing instructions; and at least one processor that, upon execution of the stored instructions, is configured to:

calculate, from the eyeball image obtained from the imaging element, a point of gaze corresponding to a line of sight of the user onto display on which a still image or a moving image is displayed;

an operation member configured to receive an operation performed by the user to perform a confirmation operation for confirming a point of gaze; and control, based on presence or absence of panning during capturing of the still image or the moving image, an operation of storing information related to the confirmation operation in association with the still image or the moving image displayed on the display means in a case where the confirmation operation is performed by the user.

* * * * *